United States Patent [19]
Vidmantas

[11] 3,981,190
[45] Sept. 21, 1976

[54] ELECTROMAGNETIC FLOWMETER HAVING INTERNAL FIELD COILS

[75] Inventor: Eugene Vidmantas, Greece, N.Y.

[73] Assignee: Sybron Corporation, Rochester, N.Y.

[22] Filed: May 23, 1975

[21] Appl. No.: 580,281

[52] U.S. Cl. .......................................... 73/194 EM
[51] Int. Cl.² .......................................... G01F 1/58
[58] Field of Search ............................. 73/194 EM

[56] References Cited
UNITED STATES PATENTS

| | | |
|---|---|---|
| 3,323,363 | 6/1967 | Ketelsen .................. 73/194 EM |
| 3,745,824 | 7/1973 | Mannherz et al. ........... 73/194 EM |
| 3,824,856 | 7/1974 | Yard ....................... 73/194 EM |

Primary Examiner—Charles A. Ruehl
Attorney, Agent, or Firm—Theodore B. Roessel; Joseph C. MacKenzie

[57] ABSTRACT

An electromagnetic flowmeter having its field coils inside a flow tube through which conductive fluid passes. The tube has a lining of material which is appropriate to the nature of the fluid. The coils are contained within boxes which are fixed to the inner wall of the flow tube, and embedded in or under the lining material.

10 Claims, 9 Drawing Figures

ELECTROMAGNETIC FLOWMETER HAVING INTERNAL FIELD COILS

FIELD OF THE INVENTION

The invention relates to a flowmeter wherein a flow to be measured generates voltages proportional to flow rate. The flow or a representative part thereof is directed through a magnetic field the direction of which is transverse to the direction of flow. The flowing material is normally a liquid but may be a slurry or other liquid or liquid-like material, so long as it has some minimal, non-zero electrical conductivity.

THE PRIOR ART

The main structural element of a flowmeter is a tube of one sort or another, which must suit the physicochemical nature of the fluid: its abrasiveness, temperature, chemical activity, pressure, and so forth. The flowmeter must also be provided with means to generate a magnetic field. Most often, such means takes the form of field coils supported in one way or another by the tube, and externally thereof. This often requires the tube to be non-magnetic in material: plastic, concrete, ceramic, certain stainless steels, and so on. However, for the larger diameters especially, ordinary steels would be preferable to most materials, at least from an overall point of view taking into account cost, ease of fabrication, strength, durability, etc. However, with ordinary steel, the field coils can no longer be mounted on the outside of the tube, because a steel tube will shield its interior from the magnetic field produced by the field coils.

It has been proposed heretofore to put the field coils in the tube, for instance, Sasaki et al. U.S. Pat. No. 3,108,474; Ketelsen U.S. Pat. No. 3,323,363; Bennett's British Pat. No. 1,072,52, but one has now to protect the field coils from the material flowing through the tube, and to support and fix them in place somehow. In the patents, the coils are protected and supported by expedients which make them pretty much inaccessible as they are inside the tube and encapsulated or otherwise hermetically clad or covered to the point of practical inaccessibility.

SUMMARY OF THE INVENTION

According to the present invention, the coils are housed in sturdy protective boxes which have the same form as the coils and are fixed to the inner surface of a pipe section forming part of the flow tube, and are made of non-magnetic material. With this arrangement, the flow tube may be provided with one or more non-magnetic linings having the appropriate degree of heat-resistance, corrosion-resistance, abrasion resistance, strength, and so forth. Unlike in the Sasaki et al. patent, the present invention makes the field coils independent of the lining whether this last is in the form of an encapsulating material which is applied in label form to the inner surfaces of the flow tube pipe section and/or a tubular element, which is given its final shape before being emplaced in the pipe section.

The invention also seals the coil boxes hermetically to the inner surface of the flowmeter tube thereby entirely isolating or separating the coils from the interior of the tube. Also, holes through the wall of the tube can be provided for allowing access to the interior of the boxes, thereby allowing the field coils to be assembled to the tube, or repaired or replaced, regardless of whether the meter is in the process original manufacture or actually in place in a pipe line having fluid flowing therethrough.

When a magnetic pipe section is used, in the flow tube and access holes are provided therein, only those parts of the field coils, which are most effective in producing the magnetic field need actually be inside the proposed.

From the foregoing, it is evident that the main object of the invention is to provide an electromagnetic flowmeter having a novel form of flow tube wherein the magnetic field producing means are supported by a pipe section of the flow tube, and are at least partly in said pipe section.

Another object of the invention is to provide an electromagnetic flowmeter having a novel form of flow tube allowing access to field coils inside the flow tube independently of interior linings, content, etc., of the flow tube.

Yet another object of the invention is to provide an electromagnetic flowmeter having a novel form of flow tube including a pipe section of magnetic material.

Finally, it is a further object of the invention to provide an electromagnetic flowmeter having a novel form of lined flow tube. Other objects of the invention will be evident from the detailed description to follow herein.

BRIEF DESCRIPTION OF THE DRAWING

FIG. 9 shows the rudiments of an electromagnetic flowmeter comprising flow tube 1, electrodes 2, field coil means 3, measuring circuitry 4, and using device 5. Flow tube 1 generally is piece of a circularly right cylindrical pipe having electrodes 2 in the wall of tube 1, at opposite ends of a diameter thereof, and bared to fluid flowing through the tube. The field coil means 3 are winding elements for producing a magnetic field having the direction of the arrow labeled FIELD (shown double-headed, as the windings are usually AC-energized). The flow, which has the direction indicated by the arrow labeled FLOW, and the magnetic field direction and the tube diameter at the electrodes, are mutually perpendicular, so flow through the tube, of even modestly electrically-conductive fluid, will generate voltages in the fluid which, for an AC field, result in an AC voltage appearing between the electrodes 2 and having an amplitude in proportion to the rate of flow between the electrodes. Electrodes 2, with measuring circuitry 4, provide a measuring means which senses the generated voltages and, in response, conditions them into a flow-representative signal for use by a using device 5, such as a recorder, flow controller or the like.

DESCRIPTION OF THE PREFERRED EMBODIMENTS

Figure 1:
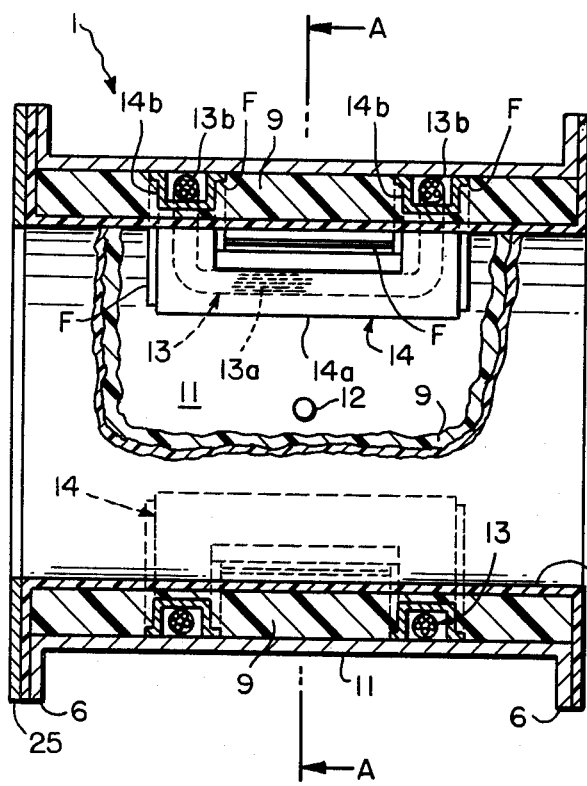
FIG. 1 is a longitudinal elevation, sectioned in plane B of FIG. 2 and partly broken away, of a novel flow tube according to my invention.
Figure 2:
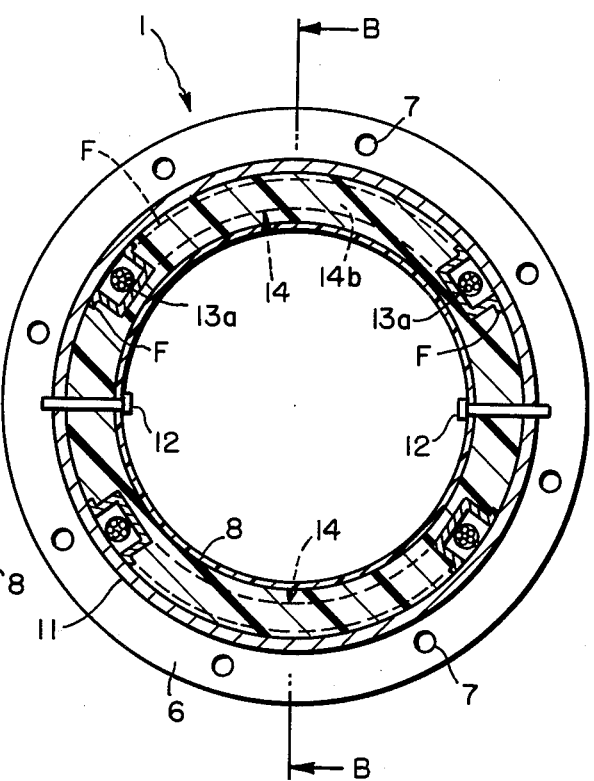
FIG. 2 is a diametral elevation, sectioned in Plane A of FIG. 1, of the novel flow tube.

In FIGS. 1 and 2, the flow tube 1 includes a circularly right-cylindrical pipe section 11 of sufficient wall thickness, having flanges 6 and made of such material, as will enable it to withstand the mechanical stresses it will be subject to when used as part of a fluid flow line in which the flow is to be measured. A circularly right cylindrical liner 8 and a circularly right-cylindrical body of potting material 9, substantially complete the flow tube. Basically, the pipe section 11 provides the strength, body 9 defines the basic flow path and liner 8 provides compatibility with the fluid which is flowing through the flow tube.

It is contemplated that pipe-section 11 may be very large, namely, up to over a yard in diameter and several yards long, so it is most desirable to make it out of conventional pipe material, such as ordinary steel, which is strong, durable, and also relatively inexpensive and easy to fabricate, as compared to stainless steel. However, this "ordinary steel" is magnetic, so it is necessary to put the field coils in the flow tube.

According to my invention, I provide field coil means in the form of conventional square saddle coils 13, having straight longitudinal portions 13a, and transverse portions 13b curved to fit the contour of the pipe section 11, and coil boxes 14, having the portions 14a and 14b conforming to the portions 13a and 13b of the coils, respectively, and housing them, said coil portions being secured in fixed position in and to said housing portion by suitable clamps, clips, or the like, not shown. The boxes 14 are made of non-magnetic material which preferably can also mechanically support the coils in fixed position and totally isolate them from other inner contents of the pipe section 11. For example, the boxes 14 may be made of non-magnetic stainless steel having inner and outer flanges F bounding the open sides of the boxes and seated flush on the inner wall of pipe section 11, to which the flanges are welded continuously about the inner and outer peripheries of the boxes, open sides.

The flow tube construction as described thus far has several advantages. Thus, the structural and positional stability of the coils 13 is assured by the boxes 14, and also is independent of the liner 8 and potting 9, so since the electrodes 12 (which need not literally have the form shown here) are also fixed to the pipe section 11, the coils of the meter will be unaffected by what happens to the liner 8 or potting 9, since installation, destruction, removal, repair, etc., of the liner or potting is prevented by the boxes 14 from affecting the coils in any way. The liner or potting can be repaired or replaced, indeed, without major effect on the original calibration.

Figure 3:
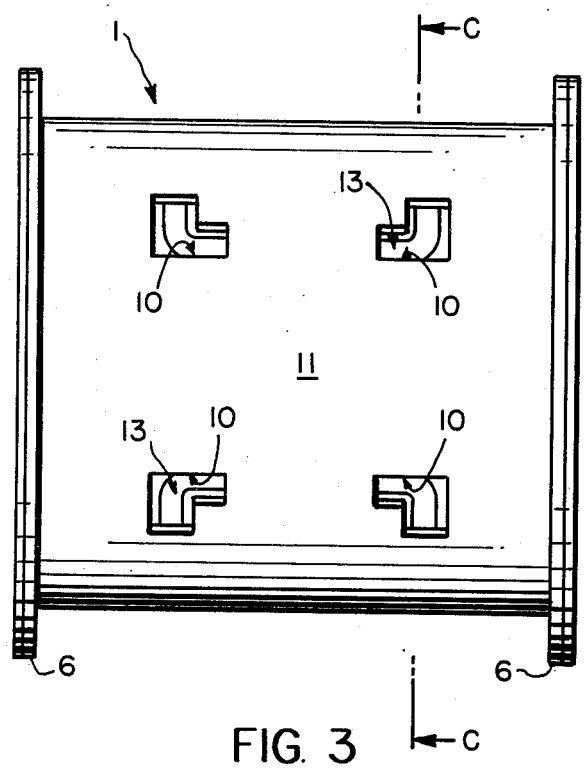
FIGS. 3, 5 and 7 are side elevations corresponding to FIG. 1 showing variants of my novel flow tube.
Figure 4:
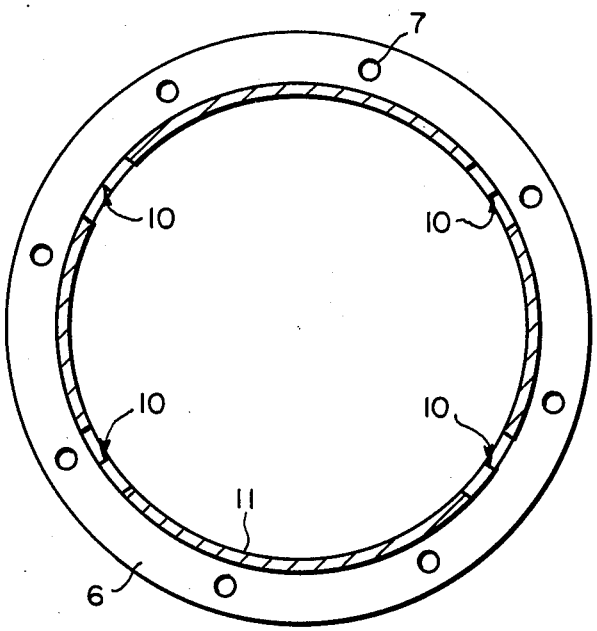
FIGS. 4, 6 and 8 are diametral sectional elevations in the manner of FIG. 2, but omitting certain parts, and corresponding to FIGS. 3, 5 and 7 respectively.

In addition, the present invention also provides for easy access to the coils 13. Thus, as FIGS. 3 and 4 show, these are L-shaped holes 10 through the wall of pipe section 11, allowing access to the interiors of boxes 14, at their corners. These holes, in effect, make the inside surfaces of boxes 14 part of the outer surface of pipe section 11, and allow for removing or installing coils 13 by threading the wires and/or wire bundles from which the coils are to be wound, into the boxes via one of the holes 10. Suitable tools, or even fingers (or hands, depending on the size of the pipe section) can be inserted in the other holes 10, in order to help wind the coil 13 into square form, in the boxes 14. (FIGS. 3 and 4 shown very little other than the holes 10 and tube 11, as it is not necessary to repeat such details as electrodes, boxes, liner, etc., as these are adequately shown in FIGS. 1 and 2.)

Figure 5:
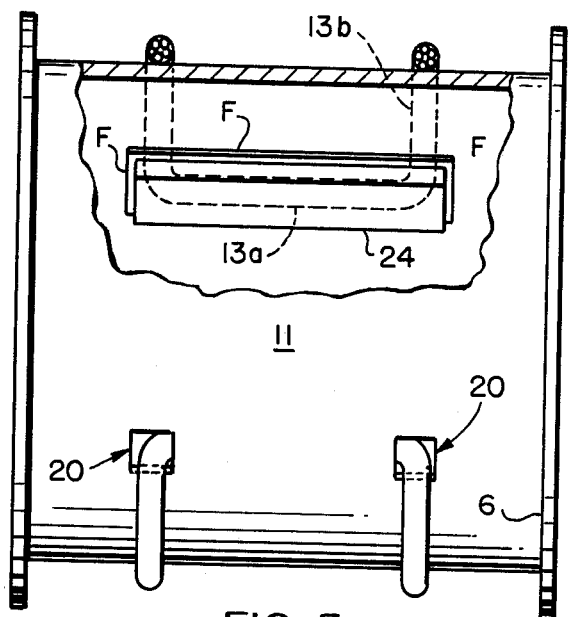
Figure 6:
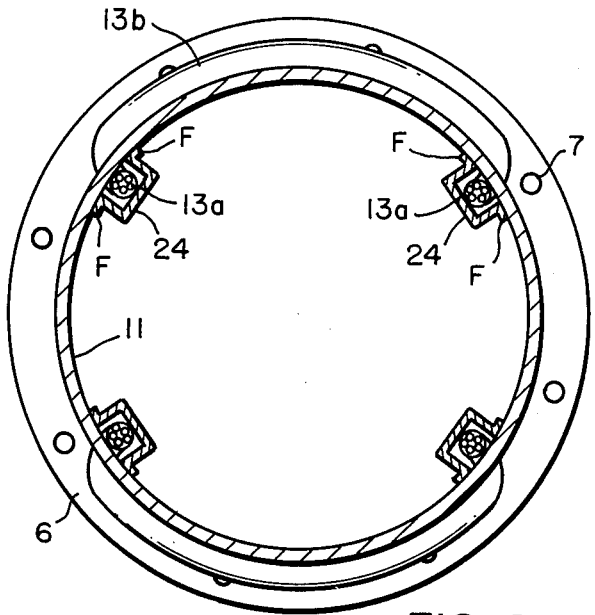

In FIGS. 5 and 6, holes 10 and boxes 14 are replaced by holes 20 and boxes 24, which make it somewhat easier to install the coils 13. As is well-known, the most effective parts of the coils for producing the field are the longitudinal portions 13a parallel to the flow, whereas the transverse portions 13b, are much less effective at this, than portions 13a. Accordingly, other than for a slight curvature to allow them to fit flush to the inner wall of pipe section 11, the boxes 24 are simple rectangular parallelepipeds, as shown, providing for getting the coil portions 13a inside pipe section 11, while leaving the portions 13b outside, an arrangement which makes it easier to thread the coils into their places. As before, the boxes are provided with a flange F which is welded to the pipe section 11 continuously about the peripheries of the boxes 24. And as before, parts such as electrodes liners, etc., are omitted from FIGS. 5 and 6.

Figure 7:
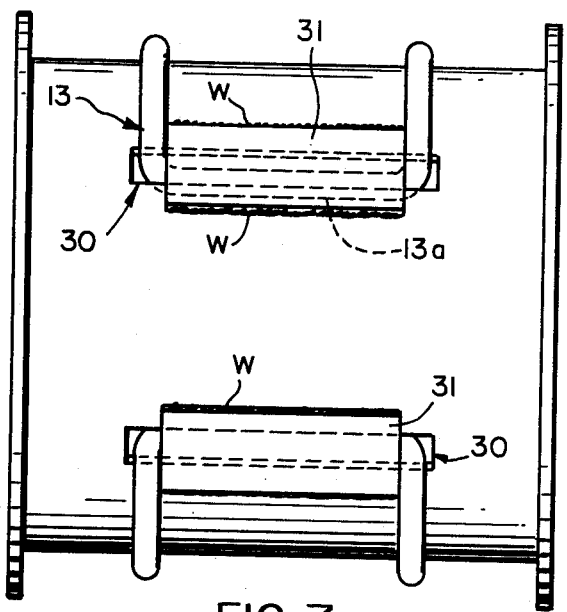
Figure 8:
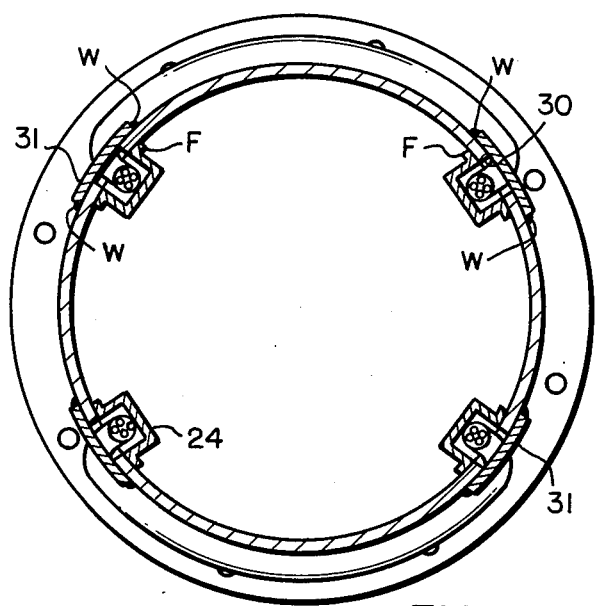
Figure 9:
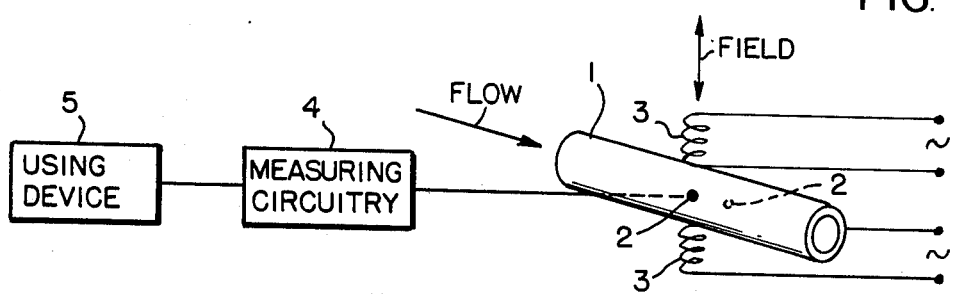
FIG. 9 shows an electromagnetic flowmeter in principle.

FIGS. 7 and 8 carry the thought of FIGS. 5 and 6 further, by replacing holes 10 with holes 30 covered by plates 31. Plates 31 are welded, as at W to pipe section 11. Plates 31 are rectangular as shown, and preferably ordinary steel plate of the same thickness of the wall. In this form, the coils 13 are formed into the final shape before applying them to the pipe section 11. After that, and before welding the plates 31 to tube pipe section 11, the coils are emplaced on the pipe section with their portions 13a in the boxes 24. The plates 31 are then welded in place, and there is achieved the effect of FIGS. 5 and 6, but rather more easily, since no threading wire or wire bundles through holes like holes 10 and 20 is involved.

It will be evident, that the thoughts behind FIGS. 3 through 7 may be extended to the point of say, extending the legs of L-shaped holes 10 till they meet on one another and form continuous square channels in the pipe section 11 in which the coils 13 can be wholly laid and then covered over by one or more plates, partly or wholly, by analogy to FIGS. 7 and 8, in order to restore the structural integrity of pipe section 11. Such extension of the illustrated concepts herein, I deem within the scope of my invention as claimed.

In the foregoing, I have not specified any particular form of end-terminals, connections, etc., for the coils or the electrodes, as these matters do not affect my invention. Again, I show providing for a pair of coils, but obviously fewer or more could be housed according to my invention, and I deem same within the scope of my claims.

Finally, although how the flow tube connects to the flow line it is to be used in is not my concern here, nevertheless, for the sake of completeness, one of the more likely cases is where the flow line inner diameter is the same as the inner diameter of pipe section 11. Here it is advisable to provide a metal ring 25 of the dimensions of the liner flange 6 at each end of the pipe section 11 (only one ring being shown, see FIG. 1) to provide both an electrical grounding means as well as protection for the ends of the liner 8. It should be noted that the usual actual flow tube according to the present invention may have an inner diameter which is larger, compared to the combined thickness of its wall, liner 8 and body 9, than FIG. 1 hereof suggests.

Having described my invention as required by 35 USC 112, I claim:

1. A flowmeter having a magnetic metal pipe-section for passing an electrically conductive fluid therethrough, field coil means for producing a magnetic field in said pipe section and transverse to flow of said fluid through said pipe section, stainless steel boxes containing said coil means, and measuring means for sensing and conditioning voltages induced in said fluid by said flow thereof transverse to said field;

said coil means being substantially enveloped by said boxes, said boxes having substantially the form and volume of said coil means, said boxes having substantially a curvature for fitting flush to the interior surface of said pipe section, and being hermetically fixed to said surface in a position substantially fitting said surface and forming a continuation thereof entirely separating said coil means from the contents of said pipe section.

2. The flowmeter of claim 1 wherein said pipe section has non-magnetic means entirely covering said surface and its said continuation, and embedding said boxes therein.

3. The flowmeter of claim 2 wherein said non-magnetic means includes a liner spaced from the inner wall of said pipe section to leave a cylindrical space between said inner wall and said liner, said space containing said boxes and being otherwise filled with potting material.

4. The flowmeter of claim 1 wherein said pipe section has holes in its side which open into said boxes, said holes being proportioned and positioned to provide access to said field coils, from the exterior of said pipe section, and independent of said boxes.

5. The flowmeter of claim 4 wherein said field coils are square-sided coils, opposite sides of which are positioned respectively parallel and perpendicular to the direction of said flow, said boxes having the shape, proportions and location of the parallel sides of said coils, and said parallel sides being in said boxes, said holes being located at either end of each of said boxes and having the perpendicular sides of said coils passing thereinto, said perpendicular sides otherwise being on the exterior of said tube.

6. A flowmeter having, in combination:
a. a flow tube having a bore providing for flow of a conductive fluid through said flowmeter;
b. field coil means in said bore for producing a magnetic field therein transverse to the flow of said fluid;
c. measuring means for sensing and conditioning voltages induced in said fluid by its said flow through said flow tube;
d. said flow tube having a magnetic pipe section, non-magnetic box means projecting inwardly into said bore, said box means defining spaces having substantially the shape and proportions of said field coil means, said spaces being located below the exterior surface of said tube but being hermetically separated from the bore of said flow tube by said box means, and said field coil means being fixedly secured in said spaces defined by said box means.

7. The flowmeter of claim 6, wherein said spaces defined by said box means is closed-off by structure of said flow tube from the exterior of said flow tube.

8. The flowmeter of claim 6, wherein said structure is a pipe section and said space defined by said box means opens to the exterior of said flow tube via holes in the side of said pipe section.

9. The flowmeter of claim 8, wherein said field coil means includes straight line elements parallel to the direction of said flow and the corresponding said holes having the same proportions as said elements.

10. The invention of claim 9 wherein said field coil means includes straight line elements parallel to the direction of said flow, and interconnected with each other by means of substantially straight line elements perpendicular to the direction of said flow; the last said elements being positioned in the exterior of said pipe and making interconnection with the first said elements via said holes.

* * * * *